United States Patent

[11] 3,605,022

[72] Inventors Vincent J. De Filipo
North Plainfield;
Andrew R. Saldutti, Clark; Stanley J. Zalesky, Red Bank, all of, N.J.

[21] Appl. No. 803,221
[22] Filed Feb. 28, 1969
[45] Patented Sept. 14, 1971
[73] Assignee The United States of America as represented by the Secretary of the Army

[54] FM RECEIVER SELF-TEST CIRCUIT
4 Claims, 4 Drawing Figs.

[52] U.S. Cl. .......... 325/363, 179/15 BF, 325/67, 325/134
[51] Int. Cl. .......... H04b 1/16
[50] Field of Search .......... 325/363, 31, 67, 344, 133, 134; 331/44, 47; 179/15 BF; 328/16; 178/6 TT

[56] References Cited
UNITED STATES PATENTS
3,353,181 11/1967 Preuss .......... 343/17.7

OTHER REFERENCES
Hillard, " Popular Electronics," March 1966, pp. 79- 80
Middleton, Electronic Servicing, October 1969, pp. 10- 13

*Primary Examiner*—Robert L. Griffin
*Assistant Examiner*—Kenneth W. Weinstein
*Attorneys*—Harry M. Saragovitz, Edward J. Kelly, Herbert Berl and Daniel D. Sharp

ABSTRACT: A self-testing equipment for a frequency-modulated receiver includes a pulse generator rich in harmonics and having a repetition frequency chosen such that the fundamental frequency is substantially equal to the channel spacing of the FM receiver being tested. The supply voltage for the pulse generator is derived from a power supply generator which produces a pulsating voltage varying periodically at a relatively slow rate. This voltage is applied to the pulse generator and serves to modulate the frequency of the pulse generator at the same rate. The accompanying harmonics of the pulse generator are also modulated but at a correspondingly high rate lying within the audio bandwidths of each receiver channel. Inserted between the power supply generator and the pulse generator is a time constant network which permits the supply voltage to vary exponentially during each power supply period. In this way, the frequency deviation of the pulse generator is controlled.

INVENTORS.
VINCENT J. DE FILLIPO
ANDREW R. SALDUTTI &
STANLEY J. ZALESKY
BY: Daniel D. Sharp,
Harry M. Saragovitz,
Edward J. Kelly & Herbert Berl
ATTORNEYS.

FM RECEIVER SELF-TEST CIRCUIT

The invention described herein may be manufactured, used, and licensed by or for the Government for governmental purposes without the payment to us of any royalty thereon.

SUMMARY OF THE INVENTION

The problem of properly testing the operational status of an entire multichannel frequency-modulated receiver for satisfactory operation has long been a vexing one. Such multichannel receivers may be tested in the laboratory where elaborate signal-generating equipment is available and where each channel can be checked separately by setting in a different signal generator frequency. This testing becomes even more complex in the case of frequency-modulated receivers, however, than in the case of amplitude-modulated receivers. One of the problems involved in such tests is that the receiver may be saturated with a signal which can override possible defective stages. For example, if one of the intermediate frequency stages of the receiver is inoperative, a signal may still pass through the receiver to the output because of the signal level input to the receiver being tested. This is true also for receivers in aircraft when flying close to a control tower where the receiver will pickup and pass the control tower signals because of the nearness to the control tower. These tests, however, are not adequate to insure that proper reception will be attained when flying several miles from a transmitting source.

What is needed, therefore, is a small testing equipment which is able to test simultaneously all channels of a multichannel frequency-modulated receiver, and which is of relatively low signal strength, such that an audible tone will be received in the frequency-modulated receiver output when the receiver is operational, even under the most adverse condition likely to be encountered.

In accordance with the invention, a self-testing circuit for a multichannel frequency-modulated receiver is developed which allows simple and rapid testing for operational capability of the frequency-modulated receiver under any operating conditions whatsoever.

The self-testing circuit can be coupled to, or connected directly into, the antenna terminals of the receiver and provides an audio tone at the receiver output whenever the receiver is operating satisfactorily. The self-testing circuit includes a pulse generator chosen such that the fundamental frequency is substantially equal to the channel spacing of the frequency-modulated receiver to be tested. The harmonics produced by the fundamental pulse frequency are then spaced throughout the FM spectrum of the receiver substantially at multiples of the channel spacings. The harmonics serve as carrier frequencies so that quieting of the receiver occurs at any channel setting. A power supply generator produces a voltage which periodically varies at a relatively slow rate. This power supply generator provides the necessary power supply for the pulse generator and the fundamental frequency of the pulse generator is varied at the same rate; in other words, the rate of variation at the power supply voltage becomes the modulating frequency for the fundamental frequency of the pulse generator. The accompanying harmonics of the pulse generator also are deviated at a correspondingly higher rate which lies within the audio bandwidth of each receiver channel. By means of a resistor and capacitor network of relatively long time constant, inserted between the power supply generator and the pulse generator, the supply voltage will vary exponentially during each power supply period and the frequency deviation of the pulse generator is controlled.

DETAILED DESCRIPTION OF THE PREFERRED EMBODIMENT

Figure 1:
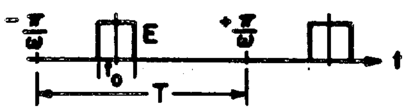
FIG. 1 is a representation of a typical pulse which can be used for modulation purposes.

FIG. 1 of the drawing shows a waveform of a periodic function, $F(t)$, of magnitude E and pulse duration $t_0$. The period T extends from $-\pi/\omega$ to $+\pi/\omega$ and is identified as $(2\pi)/\omega$. If a rectangular pulse of this nature is generated and repeated every interval, T, a periodic waveform results which gives the relative distribution of harmonics in the frequency spectrum.

By expansion of the function $f(t)$ into the Fourier series it can be shown that the amplitude of the $k$th harmonic, $a_k$, for a rectangular pulse can be given by the expression $a_k=2Eft_o(\sin kft_o)/kftao$ This distribution of harmonics is represented by a Fourier series in the form of sin $x/x$. The frequency spectrum obtained constitutes the envelope for distribution of harmonics spaced at intervals of 1/T, which is the repetition rate of the pulse. The pulse width, $t_o$, determines the first zero crossing of the envelope sin $x/x$. The frequency of this crossing is $1/t_o$. The number of harmonics in each loop of the frequency spectrum is the ratio of the interval T to the pulse width $t_o$.

Figure 2:
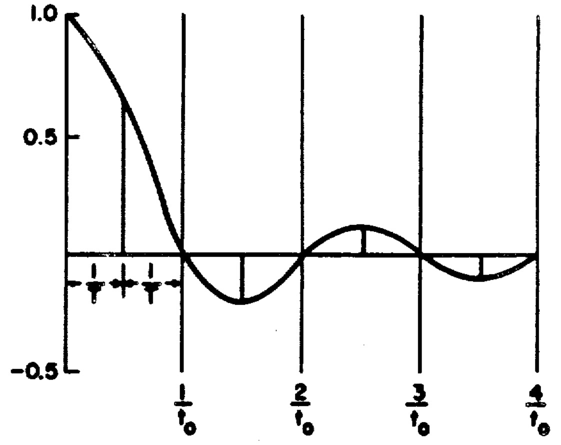
FIG. 2 is a plot showing the frequency distribution of harmonics from a symmetrical period pulse.

FIG. 2 is a plot of the amplitude of harmonics as a function of frequency and shows a portion of the frequency spectrum obtained as a result of a symmetrical periodic pulse, that is, a pulse wherein the pulse duration is exactly equal to one-half the total period T. Such a pulse can be produced by the pulse generator 12 of FIG. 3, which is frequency modulated by means including the multivibrator 10 of FIG. 3.

In designing the pulse generator 12, it is necessary to consider the channel spacing of the frequency-modulated receiver to be tested. If, for example, tactical receiver having a frequency channel spacing of 50 kilocycles is to be tested, the harmonic spacing of the pulse generator 12 likewise should be substantially 50 kilocycles so that there will be but one harmonic per frequency-modulation receiver channel. If several harmonics appear for each receiver channel, the multiplicity of harmonics will behave as noise and will adversely affect the testing of the receiver. By having but one harmonic per receiver channel, this harmonic from the pulse generator 12 serves as a carrier frequency and there is no interchannel disturbances set up. In the example shown, since harmonic spacing is equal to 1/T, the period T for the pulse generator 12 must be equal substantially to 1/50,000 or 20 microseconds. The pulse generator 12, therefore, will be designed to produce a symmetrical pulse having a period T of 20 microseconds and a pulse width of T/2=10 microseconds if the receiver to be tested has a channel separation of 50 kilocycles. Since the relative amplitudes of the harmonic become larger as the ratio of the interval T to the pulse width $t_o$ gets smaller, the amplitude of the harmonics over the range of harmonics desired will be relatively high for the symmetrical periodic pulse just described. For example, for a tactical receiver having channels from 30 to 76 megacycles spaced 50 kilocycles apart, one would expect to use the 600th to the 1,520th harmonics of the fundamentals derived from the pulse generator 12 for frequency testing of the various receiver channels.

It should be noted that the frequency of the pulse from pulse generator 12 need not be exactly 50 kHz. For example, if the pulse generator 12 is designed to generate a pulse at a frequency of 48 or 52 kilocycles, satisfactory testing can readily be achieved. As a matter of fact, this slight departure in frequency from the channel spacing may enable somewhat stronger alternate harmonics to be generated. In this connection, it should be noted that, although the plot of FIG. 2 appears to indicate alternate harmonics of zero amplitude, this is not the case during a practical receiver test, since, even if the pulse generator 12 produced a wave of precisely 50 kHz., the modulation of the pulse generator would sweep the frequency above and below the crossover points on the plot of FIG. 2 and there would be energy available of sufficient amplitude to activate the receivers. Note also that sidebands of the various harmonics are generated during the frequency-modulation process, so that there will be no absence of energy at the crossover points of the plot of FIG. 2. In the case of a receiver having channels spaced throughout the frequency spectrum of 30 MHz. at 50 kHz. intervals, the600th harmonic of the fundamental frequency (50 kHz.) of the pulse generator 12 would be used for 30 MHz. and the 1,520th harmonic for 76 MHz., etc. If, for some reason, the600th harmonic, or some sidebands thereof, should fall into the 30.05 MHz channel, testing could still be achieved since the next harmonic would fall within the 30.10 MHz. channel, etc.

The pulse generator 12, which provides the fundamental frequency of 50 kHz. and establishes the frequency distribution of harmonics spaced 50 kHz. apart throughout the FM frequency spectrum of 30 to 76 MHz. is an astable multivibrator circuit which includes transistors 25 and 26 and the usual resistor-capacitor coupling networks between the base each transistor and the collector of the other transistor. A diode 27 in the common emitter circuit of the multivibrator 12 stabilizes the operation thereof.

The multivibrator frequency of pulse generator 12 is a function of power supply generator 10, which also can be an astable multivibrator. The multivibrator 10, by way of example, generates a 2 Hz. square wave at a 0 to 4 volt level, such as shown by the dashed waveform in FIG. 4. The power supply multivibrator 10 includes a switch 30 in the common emitter circuit for initiating an output pulse at the collector of transistor 25. This output pulse from multivibrator 10 serves as the power supply voltage for pulse generator 12 which, unlike generator 10, does not have its own built-in power supply voltage. The varying supply voltage from multivibrator 10 causes the 50 kHz. fundamental of the pulse generator 12 to deviate above and below its centered frequency at a 2 Hz. rate (the frequency of the multivibrator 10).

Figure 3:
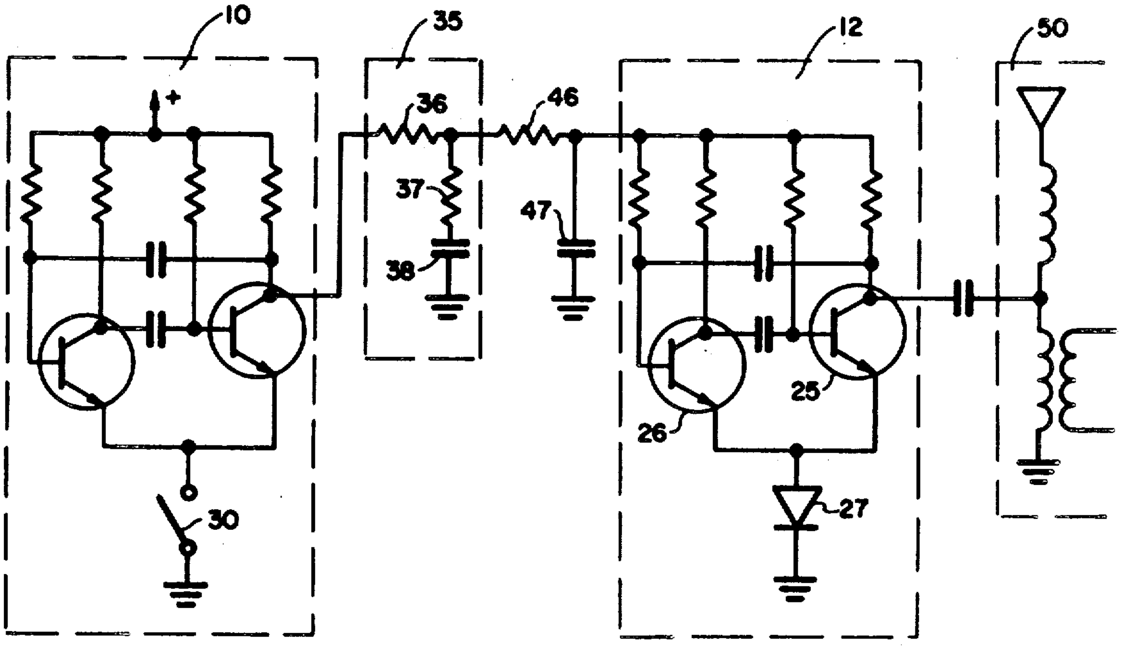
FIG. 3 is a circuit diagram showing an embodiment of a receiver self-testing equipment.
Figure 4:
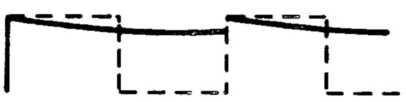
FIG. 4 is a typical pulse which is derived from the test circuit of FIG. 3.

A resistor-capacitor circuit 35 including resistors 36 and 37 and capacitor 38 is placed in the output circuit of multivibrator 10 and causes the supply voltage from multivibrator 10 to vary exponentially between supply voltage cycles, as indicated by the solid waveform in FIG. 4. By proper choice of the RC circuit parameters, the supply voltage from the multivibrator 10 is controlled to achieve the desired frequency-deviation limits of the pulse generator 12. The circuit of FIG. 3 thus provides a frequency-modulated signal at 50 kHz. which includes an adequate number of harmonics to correspond to the center frequencies of the channels of the receiver under going tests. Inasmuch as the 2 Hz. modulated frequency of the multivibrator 10 includes several harmonics, the modulating frequency of 2 Hz. is transformed to the audio range by the order of the corresponding harmonics of the pulse generator 12. For example, the1,000th harmonic of pulse generator 12 used in testing the 50 MHz. channel of the receiver, would be modulated at a rate of 2×1,000=2,000 Hz.

The output voltage from the collector of transistor 25 of pulse generator 12 can be coupled directly into the antenna terminals of the receiver 50, as shown in FIG. 3, without appreciably loading the receiver. Since the self-test circuit of FIG. 3 can be positioned very close to the receiver under test, very little energy is required of the pulse generator 12 in order to insure that the receiver is operational. The harmonics generated by the test circuit are of sufficient amplitude to be consistent with the receiver sensitivity. The greater the sensitivity of the receiver, the lower can be the output of the multivibrator and the test circuit. The resistor 46 and the capacitor 47 combine to form a decoupling network to isolate the receiver from direct current voltages.

What is claimed is:

1. A method of testing a frequency-modulated receiver having a plurality of channels spaced in frequency by a predetermined amount comprising the steps of generating by means of a pulse generator a fundamental frequency substantially equal to said channel spacing and a plurality of harmonics of said fundamental frequency, deviating the frequency of the fundamental frequency of said pulse generator at a relatively slow rate and by a predetermined amount and the frequency of the harmonics of said fundamental at a correspondingly higher rate in response to a voltage which varies slowly in frequency and which varies in magnitude during each cycle of frequency variation; and coupling the deviated fundamental and harmonics to the input circuit of said receiver for testing the operability of the receiver channels to which said harmonics correspond.

2. A method of testing a frequency-modulated receiver according to claim 1 wherein said harmonics are spaced throughout the receiver spectrum at multiples of said receiver channel spacing whereby only one of said harmonics lies within any given receiver channel.

3. A method of testing a frequency-modulated receiver according to claim 1 wherein the deviation in frequency of said harmonics which lie within the receiver channels fall within the audio range.

4. A method of testing a frequency-modulated receiver according to claim 1 wherein the signal level of said coupled frequency-deviated harmonics are consistent with the receiver sensitivity.